No. 709,504.  
W. L. McGOWAN.  
CONDUIT.  
(Application filed Feb. 8, 1902.)  
Patented Sept. 23, 1902.

(No Model.)

Attest  
R. M. Kelly,  
John Mac Master.

Inventor  
Wm. L. McGowan  
By his atty

UNITED STATES PATENT OFFICE.

WILLIAM L. McGOWAN, OF PHILADELPHIA, PENNSYLVANIA.

CONDUIT.

SPECIFICATION forming part of Letters Patent No. 709,504, dated September 23, 1902.

Application filed February 8, 1902. Serial No. 93,120. (No model.)

*To all whom it may concern:*

Be it known that I, WILLIAM L. MCGOWAN, of the city and county of Philadelphia, State of Pennsylvania, have invented an Improvement in Conduits, of which the following is a specification.

My invention relates to conduits; and it consists of the improvements which are fully set forth in the following specification and are shown in the accompanying drawings.

More particularly my invention relates to that class of conduits made up of a series of short sections united together at abutting ends to form a continuous conduit. Usually such sections are made of terra-cotta or some equivalent material and are provided with internal longitudinal partitions or walls dividing the interior of the conduit into a series of compartments adapted to receive electric cables. Such conduits are usually formed by uniting the sections together by dowel-pins and enveloping the joint in concrete or cement. It frequently happens in the laying of such conduits that one section must be arranged more or less out of alinement with another to form a bend or angle in the conduit to avoid obstructions. In such cases the dowel-pins cannot be conveniently used, and the whole strain comes upon the cement or concrete joint, and if for any cause the conduit is undermined rupture frequently occurs. If the sections are arranged at a slight angle with one another to form a bend or angle in the conduit, a gap or opening is formed at one side, and to avoid this it is customary to chip away the ends of the sections to form a tight fit. This involves time and labor, and care is necessary to make a tight joint.

It is the object of my invention to provide specially-constructed sections by which bends or angles may be formed in the conduit and by which a strong and tight union may be formed between abutting sections without the use of dowel-pins. For this purpose I provide the end of one section with a projection and the other end of the abutting section with a complementary recess to receive the projection of the first section and so construct the complementary projection and recess that the highest point of the projection and the lowest point of the recess are at relatively different distances from the median line of the corresponding section, whereby one section is caused to assume an angular direction with reference to the other.

Figure 1:
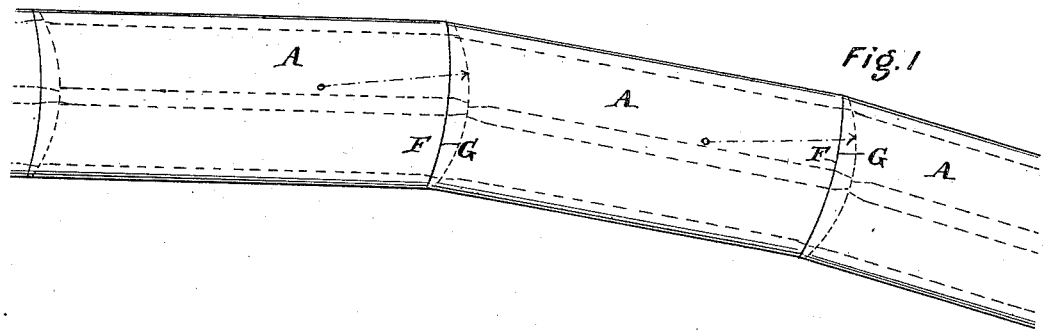
Figure 2:
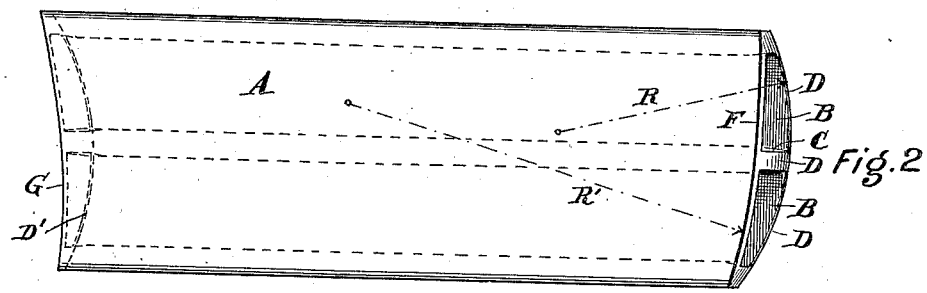
Figure 3:
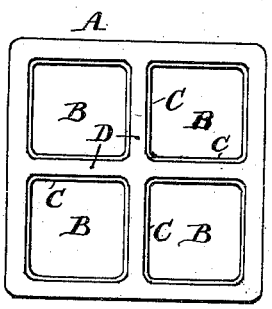
Figure 4:
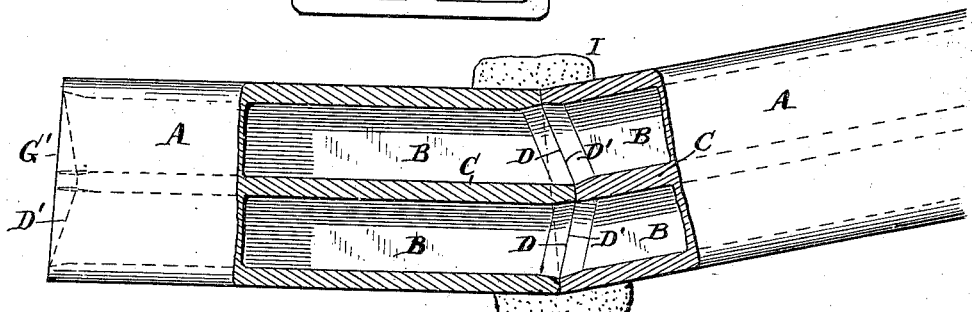

In the drawings, Figure 1 is a plan view of of the conduit embodying my invention. Fig. 2 is a plan view, enlarged, of one of the sections of the form shown in Fig. 1. Fig. 3 is an end elevation of a section of the form shown in Fig. 2. Fig. 4 is a plan view of the conduit with part in horizontal section, showing a different form of the sections.

A is the outer tubular body. It is provided with longitudinal walls or partitions C, dividing it internally into a series of longitudinal cable-compartments B. Adjacent sections are provided with more or less curved or angular ends D D', complementary one to another, but so arranged that when the projecting curved or angular end D of one section is fitted into the complementary recessed curved or angular end D' of the other section one section will assume an angular inclination with reference to the other.

In practice each section may be provided with the projecting curved or angular end D at one extremity and with the complementary recessed curved or angular end D' at the other.

In my preferred construction the projecting curved or angular end D is formed by extending the internal partitions C beyond the end F of the outer body, and the recessed, curved, or angular end D' is formed by abbreviating or shortening the internal partitions within the end G to an extent corresponding with their extension beyond the end F to form the complementary projection D. By these means the end of one section is provided with a projection which fits into and is surrounded by the socket in the other section, so that not only is the angular inclination of one section with reference to the next obtained, but a strong joint is provided which is capable of withstanding transverse strains. This joint may be packed with cement or with concrete I in the usual manner.

The angular inclination of one section with reference to another is obtained by so arranging the projection D of one section with reference to the recess D' of the other section that the highest point of the projection and the lowest of the recess are at different distances from the median line.

Either the lowest point of the recess or the highest point of the projection may be on the median line, but both must not be.

In the construction shown in Figs. 1 and 2 the ends of the outer body A are formed with curved extremities F G, bounded by arcs described by the radius R'. The projection D and recess D' are also curved, and it will be observed that while the curvature of the recess D' is complementary to the curvature of the projection D—i. e., is bounded by an equal arc of the same curvature—the center from which it is described is not at the same distance from the median line of the section as the center from which the projection D is described, and consequently when a section having a recess corresponding with D' of Fig. 2 is fitted to a section having a projection corresponding with D, Fig. 2, it will assume an angular position with reference to the first section, as shown in Fig. 1. In the particular construction shown the projection D is described by the radius R from a center out of the median line, and consequently the highest point of the projection is also out of the median line.

In the construction shown in Fig. 4 the projection D is formed by extending the inner partition-walls beyond the end F of the outer body and the recess D' by abbreviating or shortening the partition-walls within the end G', the ends of the walls being tapered or inclined, but here, as in the construction shown in Figs. 1 and 2, either the highest point of the projection D or the lowest point of the recess D' must be differently disposed with reference to the median line. In the joint shown in Fig. 4 the high point of the projection is on the median line, while the low point of the recess is out of the median line.

In some cases the projection of the partition-walls, if they are used, may be omitted, and with the curved ends F and G, as shown in Fig. 2, a curved projection and a complementary curved recess will be formed, which will engage one with the other and lock the sections against lateral displacement, while affording the same capacity of angular arrangement of one section with reference to the other. It will be observed that in the construction shown in Fig. 2 the center from which the radius R' is struck is out of the median line. These curved faces F and G form, respectively, a slight projection and recess on the ends of the section respectively beyond and within the transverse plane intersecting the four corners.

It will be observed that the sections may be so fitted together that the angular inclination of one with reference to the other may be obtained in any of the four different directions. If one of the angular sections A (shown in Fig. 1) were turned over, its inclination from the median line would be on the opposite side, and so if it were turned through ninety degrees its inclination would be either up or down. These sections may thus be used in laying conduits to avoid obstructions wherever they may be found.

The details of construction shown may be varied without departing from the invention.

What I claim as new, and desire to secure by Letters Patent, is as follows:

1. A conduit-section consisting of a tubular body having one end provided with a projection and the other end with a complementary recess, the highest point of the projection and the lowest point of the recess being located at different distances from the median line of the tubular body.

2. A conduit-section consisting of a tubular body having an end provided with a projection the highest point of which is out of the median line of the body.

3. A conduit-section consisting of a tubular body having an end provided with a recess the lowest point of which is out of the median line of the body.

4. A conduit-section consisting of a tubular outer body having longitudinal partitions or walls dividing it internally into a series of longitudinal ducts, said partition-walls at one end being extended beyond the ends of the walls of the outer body to form a projection composed of said partitions, the highest point of said projection being out of the median line of the tubular body.

5. A conduit-section consisting of a tubular outer body having longitudinal partitions or walls dividing it internally into a series of longitudinal ducts, said partition-walls at one end being abbreviated or terminated within the outer body at a distance from the end thereof, to form a recess between the ends of the partition and the ends of the outer body, the lowest point of said recess being out of the median line of the tubular body.

6. A conduit composed of tubular sections, the end of one section being provided with a projection and the end of the adjacent section having a complementary recess in which the projection of the other section fits, the highest point of the projection and the lowest point of the recess being relatively a different distance from the median line of the sections, whereby one section is caused to assume an angular inclination with reference to the other.

In testimony of which invention I have hereunto set my hand.

WM. L. McGOWAN.

Witnesses:
ELIAS NUSBAUM,
ERNEST HOWARD HUNTER.